UNITED STATES PATENT OFFICE 2,567,796

WATER-SOLUBLE AMINOSTILBENE DERIVATIVES AND PROCESS

Franz Ackermann, Binningen, Switzerland, assignor to Ciba Limited, Basel, Switzerland, a Swiss firm No Drawing. Application November 16, 1948, Serial No. 60,399. In Switzerland December 12, 1947

13 Claims. (Cl. 260—509)

According to one feature of this invention new amine derivatives are manufactured by substituting an —SO₃H group or a

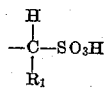

group ($R_1$=H, alkyl, aryl, or furfuryl), or a neutralized —SO₃H group or a neutralized

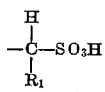

in at least one amino group of amino compounds (with the exception of amino-coumarins and amino-naphthalene sulfonic acids) which contain at least one primary or secondary amino group attached to a nucleus and which when, in the form of a solution, applied to a substratum, in particular cellulose, fluoresce blue to violet in ultraviolet light.

According to a further feature of this invention the new amino compounds are applied in industrial processes, in particular as optical bleaching agents.

Fiber materials are improved, in accordance with this feature, by applying thereto, at a suitable point in their process of manufacture or finishing, new amine derivatives as above set forth.

The new compounds have no dyestuff character but according to the constitution possess a more or less outstanding affinity for various substrata. On account of this property the products obtained according to the invention which in daylight or ultraviolet light have a blue to violet fluorescence have such an improving effect on materials to which they are applied that in the case of undyed material the whiteness is enhanced and in the case of dyed material the dyeing becomes brighter. In the case of undyed originally yellowish material the increase of the whiteness is due to the fact that the blue to violet fluorescence of the compound applied causes the originally yellowish material to appear white.

By introduction of —SO₃H or

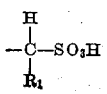

groups, and particularly of neutralized —SO₃H or

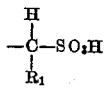

groups into the amino groups of the starting materials in accordance with the process of the invention the solubility in water is increased. In addition the fastness properties, in particular the fastness to light of the fibers treated with the end products of this process may experience an improvement.

The starting materials for the preparation of the new amine derivatives may be aminostilbenes of the general formula

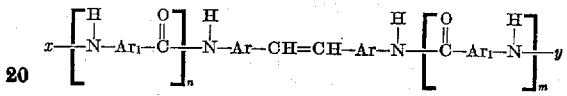

wherein Ar stands for a divalent radical of the benzene series containing at least one sulfonic acid group linked to the benzene nucleous and, if desired, other substituents such, for example, as halogen or alkyl, Ar₁ stands for a divalent radical of the benzene series which may contain groups imparting solubility in water, such as sulfonic acid groups, and also halogen and/or alkyl, $x$ and $y$ each stand for hydrogen or alkyl, and $n$ and $m$ stand for 1, 2 or 3, that is for whole numbers amounting to at most 3.

Especially suitable for the preparation of the new amine derivatives are amino-stilbenes of the general formula

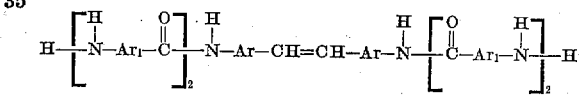

wherein Ar stands for a divalent radical of the benzene series, containing a sulfonic acid group in 2-position, if desired an additional sulfonic acid group, and also further substituents, such as alkyl or halogen, and Ar₁ stands for a divalent radical of the benzene series which may contain halogen atoms, alkyl groups, sulfonic acid groups, and the like, and, finally, aminostilbenes of the general formula

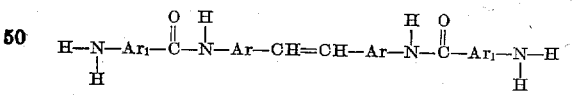

wherein Ar and Ar₁ have the above indicated meaning and may represent, for example, a phenylene radical.

Compounds of the general formula

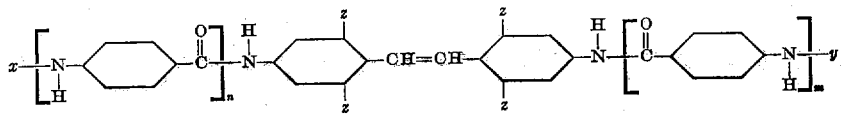

for example, are readily obtainable starting materials. In this formula, at least one $z$ in each benzene ring stands for —SO₃H and at the most one $z$ in each benzene ring stands for hydrogen, and $m$, $n$, $x$ and $y$ have the above indicated meaning.

To these compounds belong, for example, compounds of the general formula

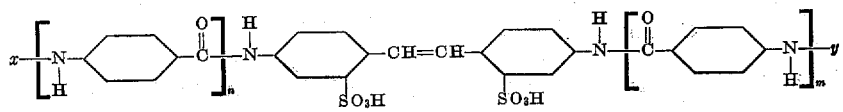

wherein $m$, $n$, $x$ and $y$ have the above indicated meaning.

The following amino-stilbenes are mentioned as specific examples: 4:4'-bis-[4-amino-benzoylamino]-stilbene-disulfonic acid-(2:2'); 4:4'-bis-[4-amino-benzoylamino] - stilbene - tetrasulfonic acid-(2:2':6:6'); 4:4' - bis - [4 - N-methylamino-benzoylamino]-stilbene-disulfonic acid - (2:2'); 4:4'-bis-[3-amino-benzoylamino]-stilbene-disulfonic acid-(2:2'); 4-[4-amino-benzoylamino]-4'- [(4-amino-benzoylamino) - benzoylamino] - stilbene - disulfonic acid - (2:2'); 4:4' - bis - [4 - (4- amino-benzoylamino) - benzoylamino] - stilbene-disulfonic acid-(2:2') of the formula

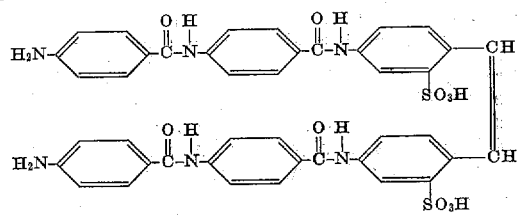

also the amino-stilbene-disulfonic acid of the formula

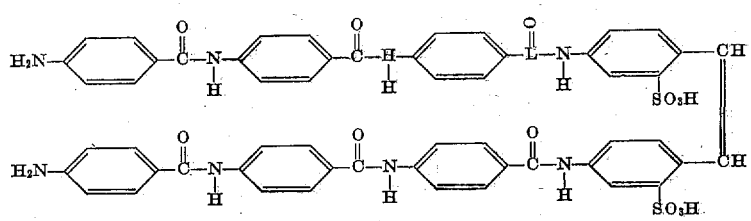

and substitution products of the amino-stilbenes mentioned, whose aromatic rings may contain additional sulfonic acid groups, halogen atoms, or alkyl radicals.

The introduction in accordance with the invention of the —SO₃H groups or the

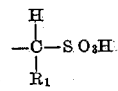

groups, or the neutralized —SO₃H groups or the neutralized

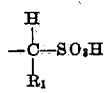

groups into the amino group of the starting materials can, for example, be effected in the following manner:

(a) Radicals of the formula

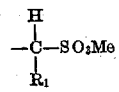

wherein R₁ stands for hydrogen, alkyl, aryl or furfuryl and Me stands for alkali, can be introduced into the amino group of the starting materials by treatment with water-soluble aldehyde-bisulfite compounds, such as are obtained, for example, from aqueous alkali bisulfite solutions and aldehydes. By treatment with formaldehyde bisulfite compounds, for example, by heating the specified amino-compounds with an aqueous sodium formaldehyde bisulfite solution to 95–100° C., radicals of the formula

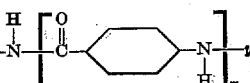

in which Me has the significance set forth above, can be introduced into the amino groups. Instead of formaldehyde bisulfite compounds also bisulfite compounds of other aldehydes such as acetaldehyde, benzaldehyde or furfural can be employed in similar manner.

(b) Radicals of the formula —SO₃H can be introduced into the amino groups of the starting materials by treatment with the addition product of sulfur trioxide or a halogen sulfonic acid, such as chlorosulfonic acid, with pyridine, advantageously in the presence of an excess of pyridine. The above named sulfonating agents may be designated as sulfonating agents which replace a hydrogen atom of an amino group by a —SO₃H-group.

The water-solubility of the products of the invention is enhanced by the subsequent conversion of the water-solubilizing sulfonic acid groups into their water-soluble salts, preferably alkali salts, ammonium salts, or salts with amines, unless such salts are directly obtained in the process of manufacture.

The introduction of —SO₃H or $$-\underset{R_1}{\underset{|}{C}}-SO_3H\text{-groups}$$

$$\overset{H}{|}$$

into the amino groups of the aforedescribed amino stilbenes leads to products which do not differ materially from each other as to the water solubility or other properties of these compounds. Irrespective of which of the two groups is introduced the resultant compounds are always anion active and owe the enhancement of their solubility in water to the same group of atoms, namely the —$SO_3H$ group.

The products of the invention can be defined as water-soluble salts of amino-stilbene derivatives of the general formula

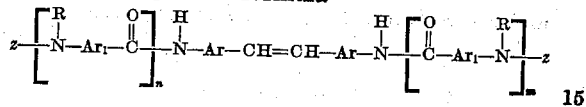

wherein Ar stands for a divalent radical of the benzene series containing at least one sulfonic acid group linked to the benzene nucleus and, if desired, an additional substituent such, for example, as halogen or alkyl, $Ar_1$ stands for a divalent radical of the benzene series which may contain water-solubilizing groups of the benzene series, such as sulfonic acid groups, and also halogen and alkyl, R stands for hydrogen or alkyl, $n$ and $m$ for whole numbers amounting to at the most 3, and $z$ for one of the radicals —$SO_3H$, —CH—$SO_3H$,   —CH—$SO_3H$,   or   —CH—$SO_3H$
 |                |                        |
 H              Alkyl                   Aryl Examples of the products of the invention are those of the general formula

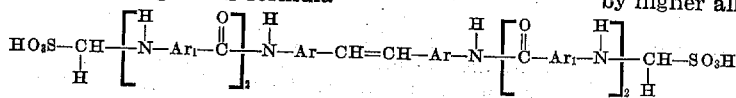

wherein Ar stands for a divalent radical of the benzene series containing a sulfonic acid group in 2-position, and $Ar_1$ for a divalent radical of the benzene series, preferably a phenylene radical, and their water-soluble salts of alkalis, ammonia, or amines. Other examples are compounds of the general formula

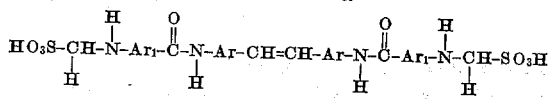

wherein Ar stands for a divalent radical of the benzene series, preferably a phenylene radical containing a sulfonic acid group in 2-position, and $Ar_1$ stands for a divalent radical of the benzene series, preferably a phenylene radical, as well as their water-soluble salts of alkalis, ammonia, or amines.

Moreover, the present invention comprises the products of the general formula

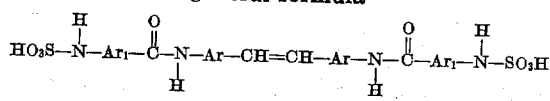

wherein Ar stands for a divalent radical of the benzene series, preferably a phenylene radical, containing a sulfonic acid group in 2-position, and $Ar_1$ stands for a divalent radical of the benzene series, preferably a phenylene radical, and their water-soluble salts of alkalis, ammonia and amines.

The application in industry of the new products obtainable in accordance with the invention can take place in such a manner that the materials to be improved are soaked in solutions, in particular, aqueous solutions of the specified compounds and after hydro-extracting or squeezing out are dried. For example, white goods, in particular, after a washing process carried out in the customary manner, can be after-treated with the products of this invention. Moreover, the new products, in particular such as are derived from 4:4'-diamino-stilbene disulfonic acid-(2:2') can be employed for the after-treatment of printed cellulosic materials.

In general, formaldehyde bisulfite condensation products of diamino compounds which contain the atom grouping

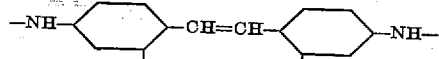

may be introduced into discharge printing pastes for cellulosic materials.

The compounds obtainable in accordance with the present process can also be employed in the course of the manufacturing process of the materials to be improved, for example, by adding them to a paper pulp.

In general, small quantities of the products obtainable according to the invention suffice in order to attain an improvement of the materials.

The compounds obtainable according to the present process can also be employed in admixture with auxiliary agents such as are employed for the improvement of fibrous materials, for example, together with washing agents (for example, in conjunction with soaps, salts of sulfonated washing agents, as for example, sulfonated benzimidazoles substituted on the 2-carbon atom by higher alkyl radicals, or also of mono-carboxylic esters of 4-sulfophthalic acid with higher fatty alcohols or together with fatty alcohol sulfonates or condensation products of higher fatty acids with aliphatic hydroxy- or amino-sulfonic acids). In this manner the materials to be improved can be simultaneously washed and bleached. A particularly noticeable brightening is obtained when undyed vegetable fibers, in particular cotton are treated with such mixtures containing washing agents.

As materials which can be improved according to this process may be mentioned, for example, the following:

Nitrogenous natural and artificial materials such as wool, silk or synthetic polyamide fibers; also cellulosic materials such as cellulose, paper, textile materials of cotton, linen, regenerated cellulose including staple fibers of regenerated cellulose; and finally synthetic materials such, for example, as are produced by polymerization. The best effects by the application of the present process are, however, obtained on vegetable fibers. The material to be improved can be employed in any desired form, for example, in fiber form or also in the form of film. The material can, for example, be undyed, dyed or printed.

The following examples illustrate the invention, the parts and percentages being by weight unless otherwise stated and the relationship of parts by weight to parts by volume being the same as that of the kilogram to the liter:

Example 1

520 parts of 40 per cent. sodium bisulfite solution are mixed with 162 parts of 37 per cent. formaldehyde solution. 1 part of sodium carbonate is added and 60 parts of the disodium salt of 4:4'-bis-[4-aminobenzoylamino]-stilbene disulfonic acid-(2:2'). The whole is boiled under reflux for 2–4 hours whereby tion takes place. Thereupon the latter is allowed to cool, treated to complete separation with sodium chloride, filtered, and the residue washed with aqueous sodium chloride solution and dried.

aminol]-stilbene-disulfonic acid-(2:2') the corresponding quantity of 4:4-bis-[4-methylamino-benzoylamino]-stilbene-disulfonic acid is used as starting material, the resultant compound has the formula

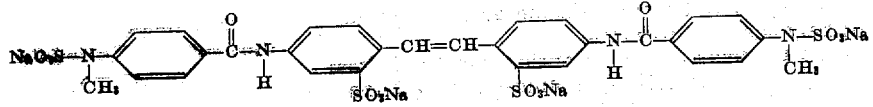

The resultant compound of the formula

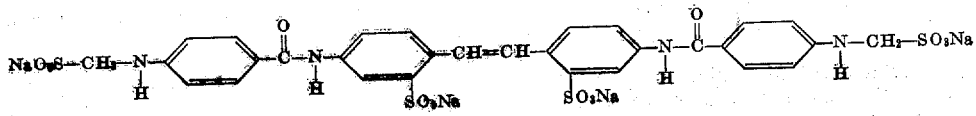

is a pale powder which is soluble in water. When the solution is applied to colorless cellulosic material the latter is caused to give a bluish fluorescence in ultra-violet light.

If in lieu of the formaldehyde-bisulfite compound a corresponding quantity of an acetaldehyde bisulfite compound is used, the compound of the formula

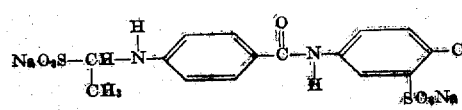

having very similar properties is obtained.

Example 2

To 50 parts of pyridine at a temperature below 40° C. 10 parts of chlorsulfonic acid are added, and thereupon 4 parts of 4:4'-bis-[4-amino-benzoylamino]-stilbene-disulfonic acid-(2:2') are also added. The temperature is raised to 90° C. and maintained for one hour at 90-95° C. Thereupon the whole is allowed to cool, poured onto ice water, neutralized with sodium carbonate and the condensation product separated with a salting out agent, for example, with sodium chloride. The new compound has the formula and is characterized by very similar properties.

Example 3

A formaldehyde bisulfite solution is produced from 52 parts of 40 per cent. sodium bisulfite solution and 16.2 parts of 37 per cent. formaldehyde solution. The resulting solution is rendered weakly alkaline with sodium carbonate.

To this are added 6 parts of the disodium salt of 4-amino-4'-[amino-benzoylamino]-stilbene disulfonic acid-(2:2'). The whole is heated for one hour to boiling and evaporated to dryness. The resultant product is the compound of the formula

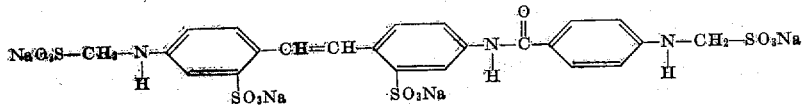

in the form of a yellow powder which is easily soluble in water. Cellulosic material to which a solution thereof is applied, when exposed to ultraviolet light has a bluish fluorescence.

If there is employed instead of the disodium salt of 4-amino-4'-[amino-benzoylamino]-stilbene disulfonic acid-(2:2'), the disodium salt of

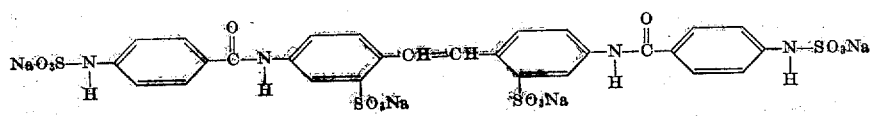

It is filtered off, washed with aqueous sodium chloride solution and dried. A light colored powder is obtained which is soluble in water. When the solution is applied to white paper, this, on exposing to ultraviolet light gives a bluish fluorescence.

If in lieu of the 4:4'-bis-[4-amino-benzoyl-

4-[4-amino-benzoylamino]-4'-[4-(4-amino-benzoylamino-benzoylamino]-stilbene disulfonic acid-(2:2') or the disodium salt of 4:4'-bis-[4-(4-aminobenzoylamino)-benzoylamino]-stilbene-disulfonic acid-(2:2'), the compounds of the formula

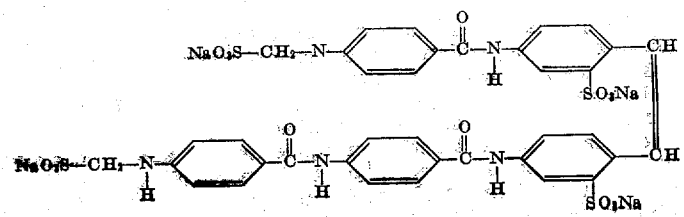

or

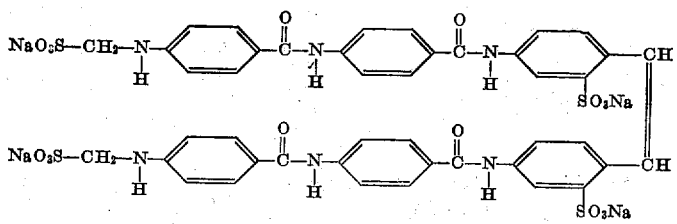

respectively, are obtained. These have very similar properties.

Also the compound of the formula

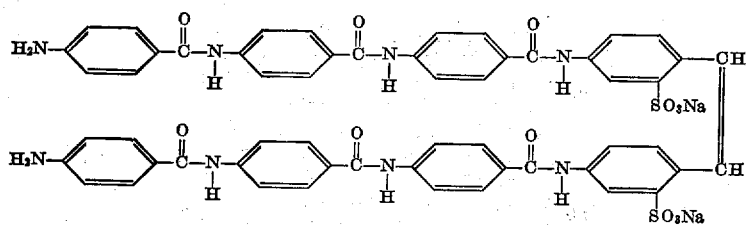

may be used as starting material.

*Example 4*

A benzaldehyde sulfite solution is produced

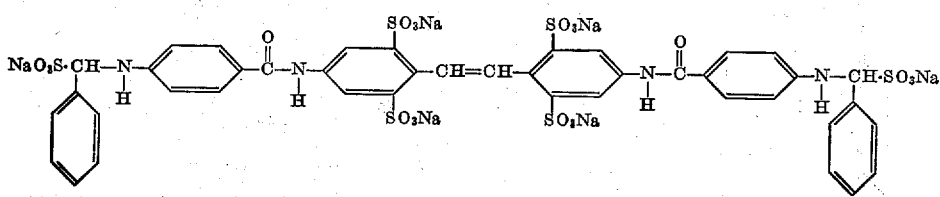

from 52 parts of 40 per cent. sodium bisulfite solution, 21.2 parts of benzaldehyde and 50 parts of water and it is rendered weakly alkaline with aqueous sodium carbonate solution. To it are added 5 parts of the disodium salt of 4:4'-bis-[4 - amino - benzoylamino] - stilbene disulfonic acid-(2:2') and the whole is boiled under reflux until the starting material has disappeared. The whole is allowed to cool, treated to complete separation with sodium chloride, filtered, and the residue washed with sodium chloride solution and dried. The compound of the formula

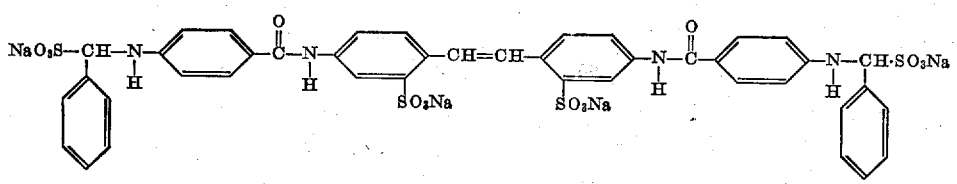

is obtained in the form of a light colored powder which is soluble in water. When this solution is applied to colorless cellulose paper this, when exposed to ultraviolet rays, assumes a bluish fluorescence.

If in lieu of 4:4'-bis-[4-amino-benzoylamino]-stilbene-disulfonic acid-(2:2'), the sodium salt of 4:4'-bis-[4 - amino - benzoylamino]-stilbene-tetrasulfonic acid - (2:2' - 6:6') or of 4:4' - bis-[4 - methylamino - benzoylamino] - stilbene - disulfonic acid-(2:2') is used as starting material, the compound of the formula

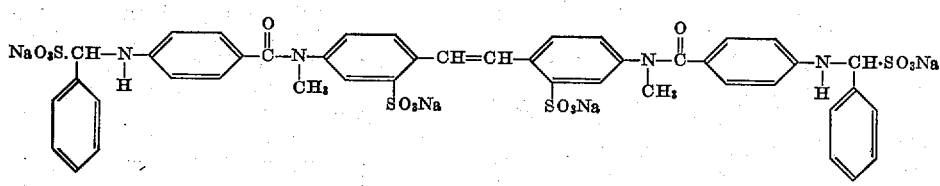

respectively, is obtained. The compounds have very similar properties.

*Example 5*

From 52 parts of 40 per cent. sodium bisulfite solution and 19 parts of furfurol, a furfurol bisulfite solution is prepared which is then rendered weakly alkaline with sodium carbonate. To it are added 6 parts of the disodium salt of 4:4'-bis-[4 - amino - benzoylamino]-stilbene disulfonic acid-(2:2') and the whole is boiled under reflux for about 1 hour, that is to say until the starting material has disappeared. The solution is allowed to cool, the condensation product separated with sodium chloride, filtered and the residue washed with aqueous sodium chloride solution and dried.

The resultant product of the formula

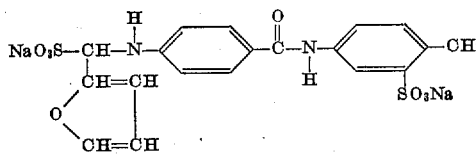

is a yellowish, water-soluble powder. The solution when applied to colorless cellulose paper exhibits a bluish fluorescence in ultraviolet light.

*Example 6*

To a paper pulp containing 100 parts of paper in a hollander are first added 2 parts of resin size and after 15 minutes 0.1 part of the product obtained according to Example 1, paragraph 1, dissolved in water. After a further 15 minutes 3 parts of aluminum sulfate are introduced. The paper mass treated in this manner is then passed through a mixer, to the paper machine.

The paper treated in this manner possesses a higher degree of whiteness than the untreated material.

*Example 7*

A cellulose fabric dyed with 4 per cent. of the dyestuff of the formula

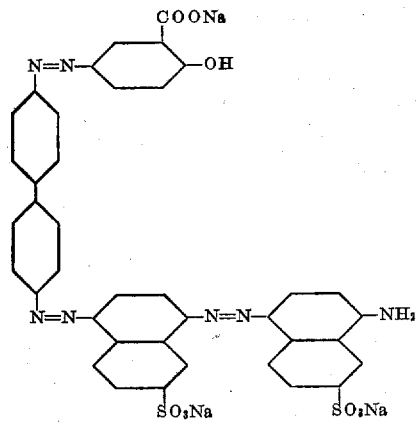

is printed with the following discharge preparation:

170 grams of sodium formaldehyde sulfoxylate,
510 grams of gum thickening 1:1,
  1 gram of the product obtained according to Example 1, paragraph 1,
319 grams of water.
———
1000 grams The printed material is dried, steamed, rinsed and again dried.

The discharged portions possess a higher degree of whiteness than is obtainable without the addition of the above-mentioned product.

*Example 8*

Regenerated cellulose staple fiber is treated on the foulard with a bath which contains in addition to the customary substances necessary for the attainment of a crease-proof effect, 1 gram per liter of the condensation product obtained according to paragraph 1 of Example 1. This treatment after the customary working up of the material has the effect not only of imparting a crease-proof effect but also an outstanding brightening.

What is claimed is:
1. A process for the manufacture of a water-soluble derivative of an aminostilbene, which

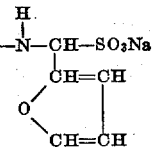

comprises reacting an aminostilbene of the general formula

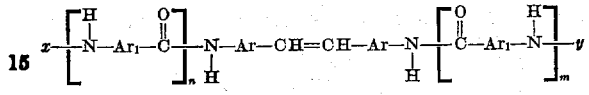

wherein Ar is a member selected from the group consisting of a divalent phenylene radical containing a sulfonic acid group in the 2-position and a divalent phenylene radical containing a sulfonic acid group in the 2- and another sulfonic acid group in the 6-position, Ar being otherwise free from substituents, Ar₁ is a divalent phenylene radical free from substituents, $x$ and $y$ are members selected from the group consisting of H and alkyl, and $n$ and $m$ are whole numbers amounting to at most 3, with a water-soluble condensation product from a water-soluble acid salt of sulfurous acid and a member selected from the group consisting of formaldehyde, acetaldehyde, benzaldehyde and furfurol.

2. A process for the manufacture of a water-soluble derivative of an aminostilbene which comprises condensing an aminostilbene of the general formula

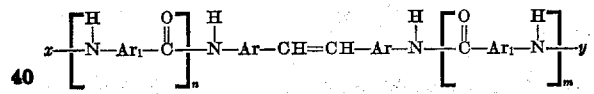

wherein Ar is a divalent phenylene radical containing a sulfonic acid group in the 2-position and being otherwise free from substituents, Ar₁ is a divalent phenylene radical free from substituents, $x$ and $y$ are members selected from the group consisting of H and alkyl, and $n$ and $m$ are whole numbers amounting to at most 3, with a water-soluble condensation product from a water-soluble acid salt of sulfurous acid and a member selected from the group consisting of formaldehyde, acetaldehyde, benzaldehyde and furfurol.

3. A process for the manufacture of a water-soluble derivative of an aminostilbene which comprises condensing an aminostilbene of the general formula

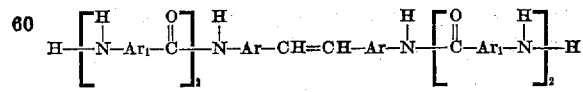

wherein Ar is a divalent phenylene radical containing a sulfonic acid group in the 2-position and being otherwise free from substituents, and Ar₁ is a divalent phenylene radical free from substituents, with a water-soluble condensation product from a water-soluble acid salt of sulfurous acid and a member selected from the group consisting of formaldehyde, acetaldehyde, benzaldehyde and furfurol.

4. A process for the manufacture of a water-soluble derivative of an aminostilbene which comprises condensing the aminostilbene of the formula

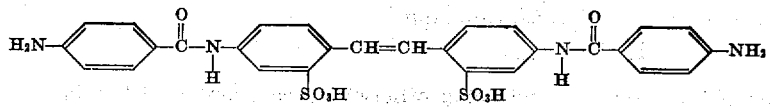

with a water-soluble condensation product from a water-soluble acid salt of sulfurous acid and a member selected from the group consisting of formaldehyde, acetaldehyde, benzaldehyde and furfurol.

5. A process for the manufacture of a water-soluble salt of the aminostilbene derivative of the formula

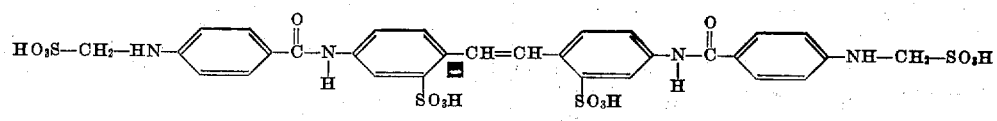

which comprises condensing 4:4'-di-(4-aminobenzoylamino) - stilbene - disulfonic acid - (2:2') with a water-soluble condensation product from a water-soluble acid salt of sulfurous acid and formaldehyde.

6. A process for the manufacture of a water-soluble derivative of an aminostilbene which comprises condensing the aminostilbene of the formula

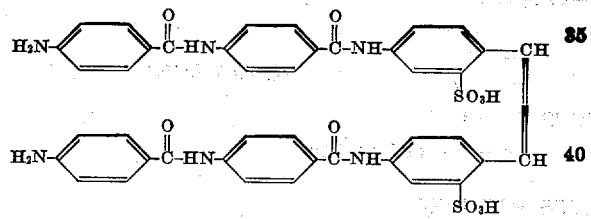

with a water-soluble condensation product from a water-soluble acid salt of sulfurous acid and a member selected from the group consisting of formaldehyde, acetaldehyde, benzaldehyde and furfurol.

7. A process for the manufacture of a water-soluble salt of the aminostilbene derivative of the formula

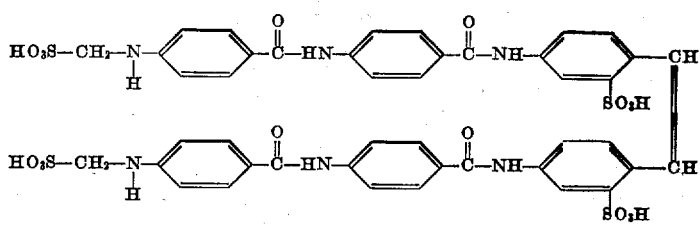

which comprises condensing 4:4'-bis-[4:(4-amino - benzoylamino) - benzoylamino] - stilbene-disulfonic acid-(2:2') with a water-soluble condensation product from a water-soluble acid salt of sulfurous acid and formaldehyde.

8. A water-soluble alkali salt of an aminostilbene derivative of the general formula

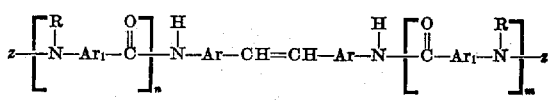

wherein Ar is a member selected from the group consisting of a divalent phenylene radical containing a sulfonic acid group in the 2-position and a divalent phenylene radical containing a sulfonic acid group in the 2- and another sulfonic acid group in the 6-position, Ar being otherwise free from substituents, $Ar_1$ is a divalent phenylene radical free from substituents, R is a member selected from the group consisting of H and lower alkyl, $n$ and $m$ are whole numbers amounting to at most 3 and $z$ is a member selected from the group consisting of

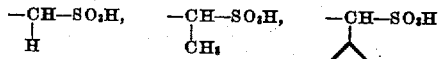

and

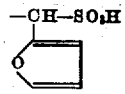

9. A water-soluble alkali salt of an aminostilbene derivative of the general formula

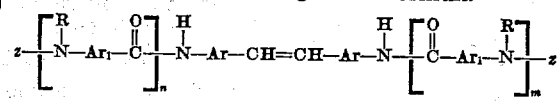

wherein Ar is a divalent phenylene radical containing a sulfonic acid group in the 2-position and being otherwise free from substituents, $Ar_1$ is a divalent phenylene radical free from substituents, R is a member selected from the group consisting of H and lower alkyl, $n$ and $m$ are whole numbers amounting to at most 3, and $z$ is a member selected from the group consisting of

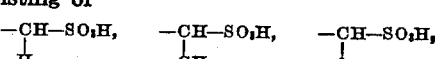

and

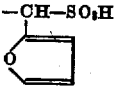

10. A water-soluble alkali salt of an aminostilbene derivative of the general formula

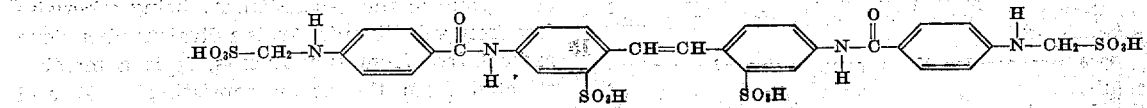

wherein Ar is a divalent phenylene radical containing a sulfonic acid group in the 2-position and being otherwise free from substituents, and $Ar_1$ is a divalent phenylene radical free from substituents.

11. A water-soluble alkali salt of the aminostilbene derivative of the formula

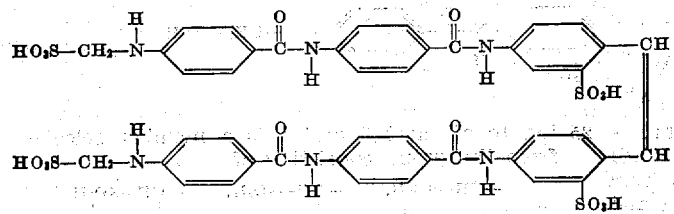

12. A water-soluble alkali salt of an aminostilbene derivative of the general formula

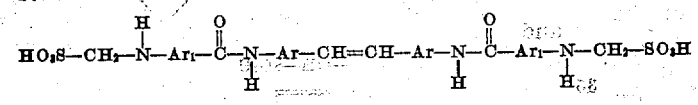

where Ar is a divalent phenylene radical containing a sulfonic acid group in the 2-position and being otherwise free from substituents and $Ar_1$ is a divalent phenylene radical free from substituents.

13. A water-soluble alkali salt of the aminostilbene derivative of the formula

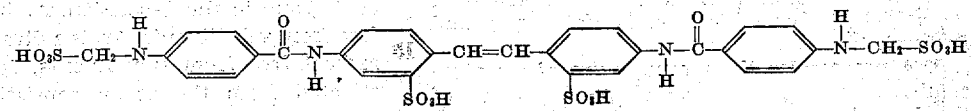

FRANZ ACKERMANN.

REFERENCES CITED

The following references are of record in the file of this patent:

UNITED STATES PATENTS

| Number | Name | Date |
|---|---|---|
| 1,497,262 | Evans | June 10, 1924 |
| 2,214,527 | Green et al. | Sept. 10, 1940 |
| 2,248,283 | Raiziss et al. | July 8, 1941 |
| 2,267,748 | Pohls et al. | Dec. 30, 1941 |

OTHER REFERENCES

Stobbe et al.: Ber., v. 46 (1913), pp. 1226–1238.

Certificate of Correction

Patent No. 2,567,796 September 11, 1951

FRANZ ACKERMANN

It is hereby certified that error appears in the printed specification of the above numbered patent requiring correction as follows:

Columns 3 and 4, lines 54 to 56, inclusive, for that portion of the formula reading

column 8, line 1, for "aminol" read *amino*; columns 7 and 8, line 69, for that portion of the formula reading

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*